United States Patent
Culver

[11] 3,762,070
[45] Oct. 2, 1973

[54] SPINAL COLUMN SIMULATOR
[75] Inventor: Clyde C. Culver, Rochester, Mich.
[73] Assignee: General Motors Corporation, Detroit, Mich.
[22] Filed: Oct. 30, 1972
[21] Appl. No.: 302,033

[52] U.S. Cl. .................................................. 35/17
[51] Int. Cl. .......................................... G09b 23/30
[58] Field of Search ........................................ 35/17

[56] References Cited
UNITED STATES PATENTS
3,557,471   1/1971   Payne et al. .............................. 35/17

FOREIGN PATENTS OR APPLICATIONS
605,262   11/1934   Germany ................................. 35/17
662,396   12/1951   Great Britain ........................... 35/17

Primary Examiner—Harland S. Skogquist
Attorney—W. E. Finken et al.

[57] ABSTRACT

A spinal column simulator for simulating human spinal column movement under impact conditions includes a number of metallic vertebra simulating disks arranged in a stacked relationship and having central annular flanges defining apertures that are aligned with each other. A number of generally annular viscoelastic elements are located between the adjacent disks and include upper and lower inwardly extending annular ribs which respectively engage the annular flanges of the associated disks to position the viscoelastic elements relative to the disks. The viscoelastic elements also include upper and lower outwardly extending annular ribs respectively engaging the outer portions of the adjacent disks. A metallic cable extends through the apertures in the disks between the opposite ends of the simulator and has a ball secured to one of its ends and seated against the adjacent terminal disk to secure the cable to the disk. A threaded fitting on the other end of the cable is received by a threaded portion of the terminal disk at the other end of the simulator to allow a slight tensioning of the cable that causes the viscoelastic elements to maintain the simulator in an upstanding configuration. The viscoelastic elements are designed to absorb and expend energy as the simulator moves from this upstanding configuration under impact loadings so that the movement of the simulator is similar to movement of the human spinal column. Split washer type bushings of a plastic material are mounted on the flanges of the disks so as to eliminate metal-to-metal contact between the cable and the disks and thereby prevent friction that would cause spurious movement of the simulator.

4 Claims, 2 Drawing Figures

PATENTED OCT 2 1973

3,762,070

SPINAL COLUMN SIMULATOR

BACKGROUND OF THE INVENTION

This invention relates generally to a spinal column simulator for simulating human spinal column movement under impact loading conditions.

The human spinal column includes a number of vertebrae arranged in a generally vertically extending relationship and providing the main structural support for the human torso, while also providing a spinal cavity for carrying the spinal cord which extends between the head and the lower portions of the body to carry nerve impulses controlling body functions. The upper or neck portion of the spinal column also, of course, supports the head on the torso. The adjacent vertebrae of the spinal column are connected by joints which function generally like ball and socket type joints to allow multi-directional angular movement of the vertebrae relative to each other and to provide the generally versatile movement of the human torso.

Since the spinal column plays such an important part in the human anatomy, devices have been constructed in the past to simulate the spinal column on dummies used in impact testing. This impact testing may be performed to study response of the human body under any of numerous impact situations. However, one area of present concern is response of the human body when riding in a vehicle subjected to impact conditions.

My United States patent application, Ser. No. 239,489, filed on Mar. 30, 1972 and assigned to the assignee of the present invention, disclosed an improved spinal column simulator in which the movement of connected vertebra simulating members is cushioned by viscoelastic elements located between the adjacent members. Use of this viscoelastic material is desirable for impact testing in that it absorbs a greater amount of energy during deflection of the joints than it expends in returning the joints to their original positions. Also, the material is rate sensitive and provides a greater resisting force for more severe impacts. These characteristics are similar to those of the human spinal column and use of the viscoelastic material thus provides very realistic results during impact studies.

The spinal column simulator disclosed by my above-mentioned application includes split ball and socket type connections connecting the adjacent vertebra simulating members. These joints are somewhat complex and, consequently, a considerable amount of time is required to assemble and disassemble this spinal column simulator.

SUMMARY OF THE INVENTION

One feature of my present invention is that it provides an improved spinal column simulator utilizing viscoelastic elements for cushioning movement of vertebra simulating disks which are attached by an elongated flexible member or cable extending through apertures in the disks and attachable to the terminal disks at the opposite ends of the simulator to provide a simulator which is readily assembled and disassembled by merely attaching and detaching the cable. Another feature of the invention is that the vertebra simulating disks have generally annular configurations with central annular flanges defining apertures through which the cable passes, and the viscoelastic elements between the disks have generally annular configurations with upper and lower annular ribs which extend inwardly and engage these annular flanges to position the viscoelastic elements relative to the disks. Another feature of the invention is that the viscoelastic elements also include outwardly extending annular ribs which engage the outer portions of the disks to control movement of the spinal column simulator when it is subjected to impact loadings. Another feature of the invention is that the cable and disks are composed of metallic materials and split washer type plastic bushings are mounted on the annular flanges of the disks to eliminate metal-to-metal contact between these components of the simulator so as to prevent spurious simulator movement not like that of the human spinal column. Another feature of the invention is that one end of the cable attaches a ball which seats against the adjacent terminal vertebra simulating disk to secure that end of the cable, and the other cable end is secured to the adjacent terminal vertebra simulating disk by a threaded fitting which is received within a threaded aperture of this disk.

BRIEF DESCRIPTION OF THE DRAWINGS

The above-identified features and other features of this invention are readily apparent from the following description of the preferred embodiment and the drawings in which.

DESCRIPTION OF THE PREFERRED EMBODIMENT

Figure 1:
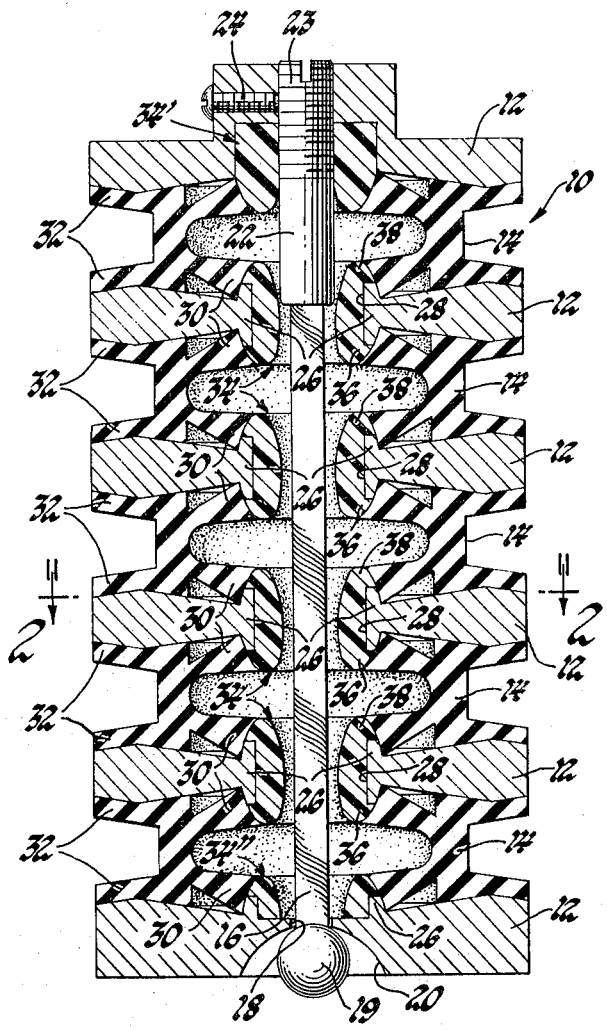
FIG. 1 is a sectional view taken generally through the central portion of a spinal column simulator according to this invention.

Referring to the drawings, a spinal column simulator is generally indicated by 10 and includes a number of annular vertebra simulating disks 12 which are arranged in a stacked relationship. A number of viscoelastic elements 14 are positioned between the disks 12 and control movement in a manner to be described. The simulator is maintained in an assembled condition by an elongated flexible member or metallic cable 16. The lower end of this cable extends through a central aperture 18 in the lower terminal disk 12 and has a ball 19 suitably secured to this cable end. The ball seats in a partial spherical depression 20 on the lower side of this disk to thus secure the lower cable end. The upper end of the cable 16 is swaged to a cylindrical fitting 22 after first passing the cable through the aperture 18 in the lower terminal disk. The fitting 22 has a threaded upper portion 23 received within a threaded aperture in the upper terminal disk 12. A set screw 24 is received by this upper disk and engages the threaded portion of fitting 22 to prevent unintended unthreading of these components of the simulator and consequent inadvertent disassembly.

The vertebra simulating disks 12 include generally annular central flanges 26 defining central apertures 28 which are arranged in an aligned relationship to receive the vertically extending cable 16. The viscoelastic elements 14 include upper and lower inwardly extending annular ribs 30 which engage these flanges 26 of the adjacent disks and position the viscoelastic elements radially relative to the disks. The viscoelastic elements also include upper and lower outwardly extending ribs 32 which engage the outer portions of the disks to control movement of the disks as the simulator is subjected to impact conditions. The outwardly extending ribs 32 have concave V-shaped depressions when viewed through their radial cross sections, and these depressions receive complementary V-shaped projections of the radial cross sections through the disks so as to further position the viscoelastic elements relative to the vertebra simulating disks.

Figure 2:
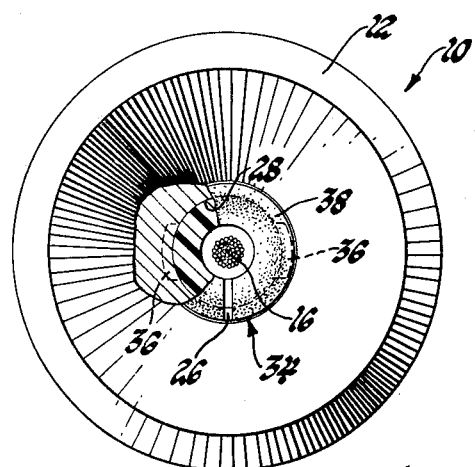
FIG. 2 is a sectional view taken generally along line 2—2 of FIG. 1 and shows the generally annular configuration of the simulator and portions of a plastic bushing which eliminates metal-to-metal contact between the central cable of the simulator and the associated metallic vertebra simulating disk.

A number of split washer type plastic bushings 34, see FIG. 2, are mounted on the flanges 26 of the disks 12. Each bushing includes a pair of ears 36 spaced 180° from each other on the lower side of the bushing. These ears snap over the lower edge of the annular flange 26 on the associated disk 12 on which the bushing is mounted by downward insertion through the disk aperture 28 prior to assembly of the simulator. The upper portions of the bushings include annular portions 38 which engage the upper edges of these flanges to thus secure the bushings in position. The inwardly extending ribs 30 of viscoelastic elements 14 also engage the ears 36 and annular portions 38 of the bushings as seen in FIG. 1. The upper and lower terminal disks 12 of the simulator support bushings 34' and 34'' which are similar to bushings 34 but only function on one side of their respective disks instead of both sides like bushings 34. With these bushings secured in position on the disks of the simulator, metal-to-metal contact between the cable and the disks is eliminated to prevent friction that would cause spurious movement of the simulator during impact testing.

The assembled spinal column simulator is mounted on an impact test dummy to simulate the neck portion, the lower back portion, or the total length of the spinal column. The viscoelastic elements 14 maintain the disks 12 of the simulator in their aligned relationship giving the simulator a generally upstanding configuration when it is mounted on the dummy. When the dummy is subjected to impact loadings, lateral impact forces are applied to the upper end of the simulator and cause the simulator to bend from its FIG. 1 position. The viscoelastic elements 14 are squeezed between disks 12 during this bending movement of the simulator and absorb a quantity of energy. As the impact forces subside, the viscoelastic elements return to their original configurations and expend only a portion of the quantity of absorbed energy in returning the disks 12 to their aligned relationship and the simulator to its original upstanding configuration.

For the spinal column simulator to function in the most desirable manner, the ratio of the energy which the viscoelastic material absorbs during bending of the simulator to that which it expends as it moves the simulator back to its original position must be between the limits of 1.25 and 2.75 for impact loading applied in time periods less than 300 milliseconds. These strictures are discussed in detail in my previously mentioned application, Ser. No. 239,489, and as such will not be herein discussed in detail.

It is thus apparent that this improved spinal column simulator uses viscoelastic material to control its movement and is readily assembled and disassembled with a minimum of time and effort.

What is claimed is:

1. A spinal column simulator for simulating human spinal column movement under impact conditions, the simulator comprising, a plurality of vertebra simulating disks having generally annular configurations with central apertures extending therethrough, the disks being arranged in a stacked relationship with their apertures aligned, a plurality of generally annular viscoelastic elements respectively located between the adjacent disks and having central apertures aligned with the apertures of the disks, an elongated flexible member extending through the apertures in the disks and the viscoelastic elements between the opposite ends of the simulator, first means for securing one end of the flexible member to the terminal disk at one end of the simulator, and adjustable second means for detachably securing the other end of the flexible member to the terminal disk at the other end of the simulator so as to allow a slight tensioning of the flexible member that normally maintains the simulator in an upstanding configuration, the viscoelastic elements normally preventing movement of the simulator from its upstanding configuration and being designed to absorb and expend energy as the simulator moves from this configuration under impact loadings so that the movement of the simulator is similar to movement of the human spinal co'umn when subjected to impact loading.

2. A spinal column simulator for simulating human spinal column movement under impact conditions, the simulator comprising, a plurality of vertebra simulating disks having generally annular configurations with central annular flanges defining central apertures in the disks, the disks being arranged in a stacked relationship with their apertures aligned, a plurality of generally annular viscoelastic elements located between the adjacent disks, each viscoelastic element having upper and lower inwardly extending annular ribs which respectively engage the annular flanges on the associated disks to position the viscoelastic element relative to the disks, an elongated flexible member extending through the apertures in the disks between the opposite ends of the simulator, first means for securing one end of the flexible member to the terminal disk at one end of the simulator, and adjustable second means for detachably securing the other end of the flexible member to the terminal disk at the other end of the simulator so as to allow a slight tensioning of the flexible member that normally maintains the simulator in an upstanding configuration, the viscoelastic elements normally preventing movement of the simulator from its upstanding configuration and being designed to absorb and expend energy as the simulator moves from this configuration under impact loadings so that the movement of the simulator is similar to movement of the human spinal column when subjected to impact loading.

3. A spinal column simulator for simulating human spinal column movement under impact conditions, the simulator comprising, a plurality of metallic vertebra simulating disks having integral flanges of a generally annular configuration so as to define central apertures in the disks, the disks being arranged in a stacked relationship with their apertures aligned, a plurality of generally annular viscoelastic elements located between the adjacent disks, each viscoelastic element having upper and lower inwardly extending annular ribs which respectively engage the annular flanges on the associated disks to position the viscoelastic elements relative to the disks, each viscoelastic element also having upper and lower outwardly extending annular ribs respectively engaging the outer portions of the adjacent disks, a metallic cable extending through the apertures in the disks between the opposite ends of the simulator, first means for securing one end of the cable to the terminal disk at one end of the simulator, adjustable second means for detachably securing the other end of the cable to the terminal disk at the other end of the simulator so as to allow a slight tensioning of the cable that normally maintains the simulator in an upstanding configuration, the viscoelastic elements normally preventing movement of the simulator from its upstanding configuration and being designed to absorb and expend energy as the simulator moves from this configuration under impact loadings so that the movement of the simulator is similar to movement of the human spinal column, and plastic bushings mounted on the annular flanges of the disks to eliminate metal-to-metal contact between the cable and the disks during movement of the simulator and to thus prevent friction that would cause spurious movement of the simulator.

4. A spinal column simulator for simulating human spinal column movement under impact conditions, the simulator comprising, a plurality of metallic vertebra simulating disks having integral flanges of a generally annular configuration so as to define central apertures in the disks, the disks being arranged in a stacked relationship with their apertures aligned, a plurality of generally annular viscoelastic elements located between the adjacent disks, each viscoelastic element having upper and lower inwardly extending annular ribs which respectively engage the annular flanges on the associated disks to position the viscoelastic elements relative to the disks, each viscoelastic element also having upper and lower outwardly extending annular ribs respectively engaging the outer portions of the adjacent disks, a metallic cable extending through the apertures in the disks between the opposite ends of the simulator, a ball secured to one end of the cable and seated against the terminal disk at one end of the simulator so as to secure this cable end, a threaded member secured to the other end of the cable and threaded into the terminal disk at the other end of the simulator so as to secure this cable end and permit the cable to be tensioned to a slight degree, the tensioning of the cable normally maintaining the simulator in an upstanding configuration and the viscoelastic elements being designed to absorb and expend energy as the simulator moves from this configuration under impact loadings so that the movement of the simulator is similar to movement of the human spinal column, and plastic bushings mounted on the annular flanges of the disks to eliminate metal-to-metal contact between the cable and the disks during movement of the simulator and to thus prevent friction that would cause spurious movement of the simulator.

* * * * *